United States Patent

Bellovin et al.

Patent Number: 5,870,557
Date of Patent: Feb. 9, 1999

[54] METHOD FOR DETERMINING AND REPORTING A LEVEL OF NETWORK ACTIVITY ON A COMMUNICATIONS NETWORK USING A ROUTING ANALYZER AND ADVISOR

[75] Inventors: Steven Michael Bellovin, Westfield; Barbara E. Moo, Gillette, both of N.J.

[73] Assignee: AT&T Corp, Middletown, N.J.

[21] Appl. No.: 679,782

[22] Filed: Jul. 15, 1996

[51] Int. Cl.$^6$ ............ G06F 11/30; G06F 13/00; G06F 13/36; G06F 13/40

[52] U.S. Cl. ............ 395/200.54; 395/200.65; 395/200.46

[58] Field of Search ............ 395/159, 200.12, 395/200.65, 200.13, 200.46, 200.54; 370/58, 54; 364/514, 550

[56] References Cited

U.S. PATENT DOCUMENTS 5,042,027  8/1991  Takase et al. ............ 370/54
5,261,044  11/1993  Dev et al. ............ 395/159
5,675,741  10/1997  Aggarwal et al. ............ 395/200

OTHER PUBLICATIONS

Sedayao, J., and Akita, K., LACHESIS: A Toll for Benchmaking Internet Service Providers, 1995 LISA IX, Sep. 17–22, 1995, pp. 111–115.

Primary Examiner—Glenton B. Burgess
Assistant Examiner—Mark E. Gaski

[57] ABSTRACT

A system identifies transmission routes between a user and a desired destination site on a wide area communications network, such as the Internet. The system then detects transit characteristics for each of the transmission routes. A user can request the level of activity on the routes. Thus, the user can be apprised of the existence of possible congestion in any attempt to access the desired destination site.

10 Claims, 4 Drawing Sheets

METHOD FOR DETERMINING AND REPORTING A LEVEL OF NETWORK ACTIVITY ON A COMMUNICATIONS NETWORK USING A ROUTING ANALYZER AND ADVISOR

BACKGROUND OF THE INVENTION

The present invention provides information to a user about network traffic to selected sites on the Internet. In particular, the present invention is directed to providing a service by which users of the Internet can be apprised of potential congestion from various Internet access points to web sites of interest.

The Internet has become a powerful tool that provides its users with tremendous capabilities to search for and obtain desired pieces of information. As known in the art, the Internet sometimes referred to as a "wide area network" is a network of interconnected networks. As more and more users have found benefits on the Internet, more and more information points have also been provided, typically in the form of web sites. These sites provide the user with different types of information. Some of these sites are exceptionally popular and are in high demand for access. As a consequence, those sites can be heavily burdened at various times during the day.

In addition, a business of providing Internet access has developed. There are many access providers that provide their subscribers with one or more entry points into the Internet. An example of this is shown in FIG. I where a user 101 is connected to an Internet access provider 102 which in turn provides the user with a pathway to the Internet 103. As a consequence, the user can communicate with the web site 104, (105).

Once a subscriber has entered the Internet and desires to be in communication with a given site, the subscriber must be routed to that site. All routing typically takes place via multiple intermediate points also known as routers. An example of such a construction is illustrated in FIG. 2.

An Internet access provider 202 has two access points into the Internet, 202A and 202B. A subscriber to this provider may be interested in communicating with web site 210. The subscriber may be routed to the desired web site in any number of ways. For example, the subscriber may be routed from entry point 202A to node A (also known as a router) in the Internet. One or more nodes can be associated with one of the multiple data communications networks that form the Internet. Then the subscriber could be routed to node C, node D and ultimately to the desired web site. Each node has the intelligence to be able to select what it perceives to be the most efficient way to transfer the subscriber from that node to its ultimate destination. That intelligence is somewhat limited. Typically the routing decisions are not based on actual load conditions since this would involve extremely complex calculations. Instead the decisions may be based on knowledge of network topology, e.g., disabled routers, lines coming up or going down. The subscriber in question could alternatively be routed from the entrance way 202A to node A then to node B then to node C, node F, and finally to node D before being placed into contact with the desired web site. Each of these links between nodes is referred to as a hop. Some of these links are very high traffic links because they act as main throughways between critical nodes. Alternatively, they could be links which are more closely associated with or coupled to popular web sites. In this case, then the popularity of the associated web site results in increased traffic on that link.

Normally, the user is assigned to an Internet access point in accordance with the user's location with respect to the Access Provider's entry points. It is desirable for users to be able to know how congested the traffic route is from their entry point onto the Internet to a web site of interest.

SUMMARY OF THE INVENTION

The present invention provides a method for periodically analyzing the congestion along routes from an access provider's entry point into the Internet to desired web sites. The congestion information is stored in one or more access provider service database platforms. A user is automatically provided with an indicator which highlights the availability of a congestion-reporting service. The user can then select a web site of interest and see the congestion along routes to that web site from the access provider. In addition, the user may be given the option to designate a particular web site as being of interest to obtain information related to that site.

The present invention takes advantage of a simple command already available on the Internet for tracing routes to a particular destination. The present invention repeatedly executes this command with respect to one or more web sites of interest and compiles critical information about the transit characteristics from an entry point into the Internet to the desired web site. Such characteristics can include round trip time between an Internet access point and routers along a path to the desired web site. The characteristics also can include an average of the number of data packets lost along a route during execution of the command. The transit characteristics are compiled and analyzed to provide the user with useful information about congestion along routes to the web site of interest. The analysis may include identifying particular hops at which there is likely to be congestion based on the average round trip delay and packet loss information that becomes available from execution of trace route.

According to a feature of the invention, one or more communications networks within the Internet may be identified to the user and/or to the operators of these communications networks as the source of the congestion on the routes leading to the desired web site.

DETAILED DESCRIPTION

Figure 1:
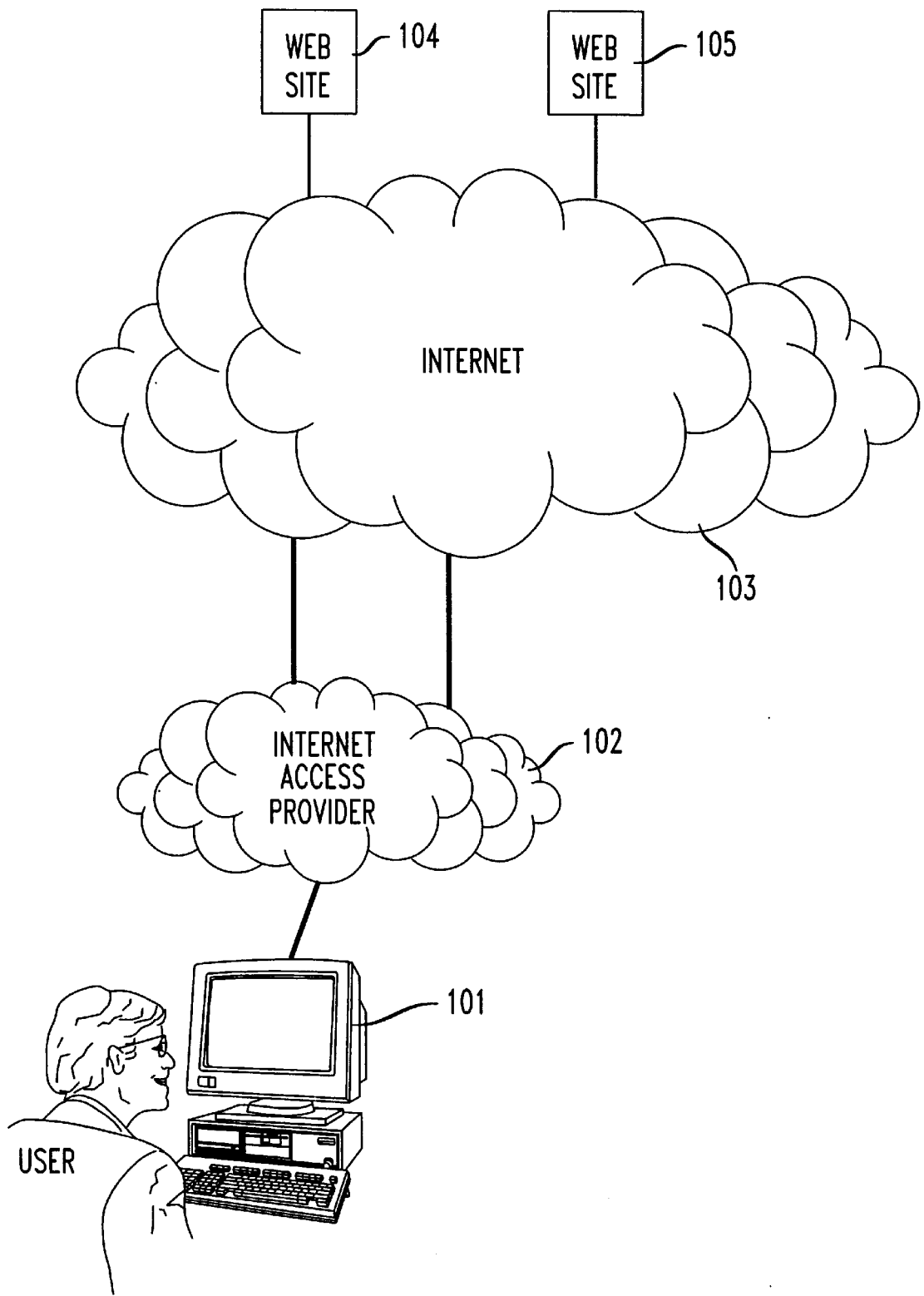
FIG. 1 is a schematic diagram of prior art for a known network arrangement.
Figure 2:
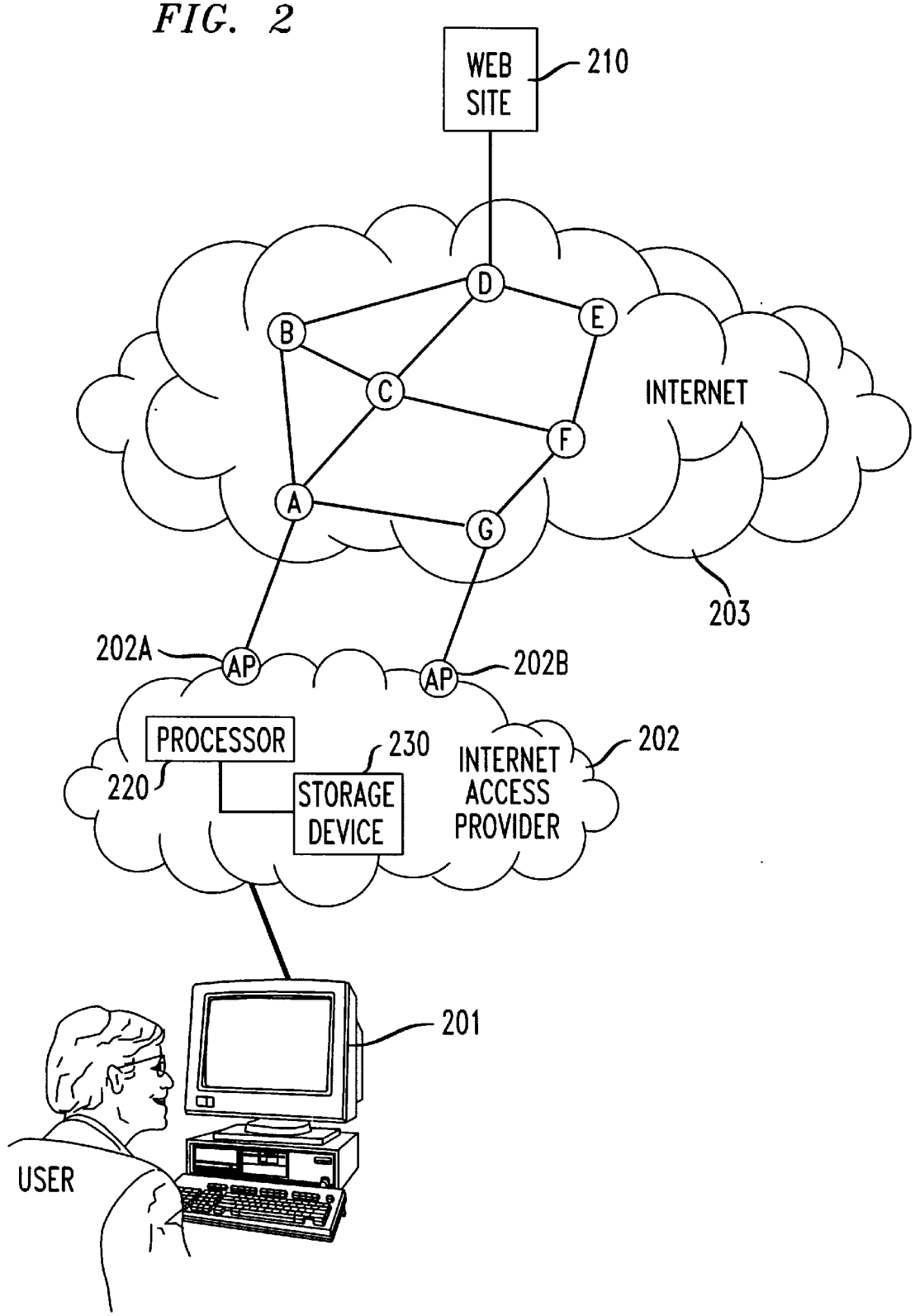
FIG. 2 is a schematic diagram showing elements of FIG. 1 in greater detail.

As described in the Background section, FIG. 2 illustrates a known configuration representative of the networking connections between an Internet access provider's access point and a particular web site. In accordance with the present invention, one or more important destinations are selected from known popular site's. Alternatively, the popularity of a given site may be determined in accordance with the traffic monitoring operation which is described below, i.e., the access provider may semi-randomly select sites (e.g., based on such criteria as known number of hits on a historical basis to a given site and may then study the traffic to the selected web sites). Then, based upon the monitoring of the traffic, the access provider may determine that some sub-set of web sites are of particular interest. In the alternative, a site may be selected based on its mention in the popular media or on major on-line sources and could be treated as the "cool site of the day".

Next the access provider identifies the various connection points into the Internet which are available through that provider. Then the provider uses standard tools to detect transit characteristics between a given entry point into the Internet and one of these predetermined important destinations. The operation of the tool, "the traceroute command", will be described in further detail below. However, the execution of this command provides important information about the hops between end points, round-trip transmission time between each of a plurality of links from an entry point into the Internet to the desired web site, and the frequency with which data packets are lost or dropped.

It should be noted that the selection of a pathway from one entry point to the web site is actually a dynamic process that can change over time. The pathway is determined by intermediate decisions made at the various nodes as the connection is being established. For instance, at time T1 node A performs a calculation of the most appropriate route for traversing the net to web site X and thus establishes a link with node C. At some later time T2 node A may determine that the most appropriate route really calls for a link to node G rather than node C. As described earlier the routing decisions are typically made based on information about network topology, e.g., the status of certain lines either coming up or going down. These preferential selections of establishing node links or hops generally remain stable for a few minutes. Thus, the execution of this feature by the present invention will provide snap shots over time of the congestion of the network. To be a useful information source the congestion must be monitored on a periodic basis to capture those changes in routing that occur over time. In accordance with the present invention this could be done 5 or 6 times an hour for example.

The gathering of transit characteristics from a particular entry point to a desired web site will now be described.

The traceroute command is a well known command for tracking the routing of a connection from one point to another on the Internet. The traceroute command actually tries to transfer a packet across various points on the Internet from a starting node to a destination node. The command will be set with a definition of the maximum number of hops, i.e., intermediate links, which are permissible between the two termination stations. Furthermore, the command will determine the size of the data packet to be transferred. In the example described below the traceroute command is run to a popular site on the web, namely www.netscape.com. The command is set so that the default number of maximum hops is thirty and the packet size is set at 40 bytes.

In actual execution, the command builds the route in a series of repeated operations. First, the system will prescribe a one hop transfer and it will attempt this transfer a predetermined number of times selectable by the party executing the command. It will detect round-trip transmission time to the first hop that is selected for each access. Then two hops will be permitted and since the command is running so quickly the routing will be through the first node accessed through the first hop and a second node. The round-trip transmission time will again be detected. This operation of permitting one additional hop per execution of the route checking will be continued until connection is established to the desired web site.

The results of one execution of this traceroute command are shown below.

$ traceroute www.netscape.com
traceroute to www1.netscape.com (198.95.251.30), 30 hops max, 40 byte packets
1 ged (135.104.104.1) 3.526 ms 33.635 ms 106.099 ms
2 hubble-rbone (135.104.1.7) 3.404 ms 5.828 ms 5.034 ms
3 stile (135.104.2.7) 189.526 ms 128.351 ms 45.663 ms
4 192.20.225.1 (192.20.225.1) 57.516 ms 59.227 ms 14.097 ms
5 New-Brunswick1.NJ.ALTER.NET (137.39.186.161) 28.3 ms 24.363 ms 20.82 ms
6 137.39.108.3 (137.39.108.3) 22.781 ms 26.802 ms 22.328 ms
7 137.39.100.14 (137.39.100.14) 21.764 ms 29.485 ms 24.06 ms
8 137.39.33.99 (137.39.33.99) 26.63 ms 29.819 ms 27.685 ms
9 137.39.100.29 (137.39.100.29) 34.992 ms 33.063 ms 36.249 ms
10 sprintnap.mci.net (192.157.69.11) 37.336 ms 225.073 ms*
11 -hssi3-0.WestOrange.mci.net (204.70.1.209) 70.656 ms 248.1 ms 238.202 ms
12 core 2.SanFrancisco.mci.net (204.70.201) 313.694 ms 212.713 ms 113.834 ms
13 *borderx2-fddi-1.SanFrancisco.mci.net (204.70.158.68) 1 86.739 ms*
14 204.70.158.122 (204.70.158.122) 167.243 ms 236.737 ms 2 44.549 ms
15 www1.netscape.com (198.95.251.30) 102.303 ms 105.281 ms 99.058 ms This command gives three valuable pieces of information. First, it identifies each router, e.g., "hubble-rbone" at hop 2. Second, it provides a number of round trip time values to a given router from the starting point. Third, it indicates when data packets are lost. For example, it is seen then that the first node identified as ged, having a routing identifier 135.104.104.1, is accessed three times with varying round-trip transit times. The second node—hubble-rbone (135.104.1.7) is then analyzed. This continues until by step 15 connection is made to www1.netscape.com, the final desired destination. During the testing some packets are dropped. This is indicated in each path test by an asterisk (*) in place of a round-trip time.

In the present example, the round-trip time increases dramatically at hops 10 and above. At hop nine the times range from 33.063 ms to 36.249 ms. However, at hop 10 one round-trip time is 225.073 ms and one data packet is lost or dropped. The significantly higher round-trip times and the possibility of dropping packets continues from hop 10 to hop 15. As a consequence of this analysis, the Internet access provider can understand that there is congestion at hop 10 so that through-put will not be great on this path.

A second example is shown below with respect to tracing the route to the mail server for Cambridge University in the UK.

$ traceroute ppsw3.cam.ac.uk
traceroute to ppsw3.cam.ac.uk (131.111.8.38), 30 hops max, 40 byte packets
1 ged (135.104.104.1) 3.114 ms 2.421 ms 2.275 ms
2 hubble-rbone (135.104.1.7) 3.627 ms 81.969 ms 3.752 ms
3 stile (135.104.2.7) 9.485 ms 3.885 ms 7.703 ms
4 192.20.225.1 (192.20.225.1) 12.176 ms 8.176 ms 6.123 ms
5 New-Brunswick1.NJ.ALTER.NET (137.39.186.161) 21.963 ms 20.066 ms 48.494 ms 6 137.39.108.3 (137.39.108.3) 75.51 ms 118.478 ms 22.67 ms
7 137.39.100.14 (137.39.100.14) 62.625 ms 16.756 ms 206.483 ms
8 137.39.33.99 (137.39.33.99) 130.227 ms 162.452 ms 21.052 ms
9 137.39.100.29 (137.39.100.29) 42.83 ms 33.61 ms 38.147 ms
10 f0-0.enss219.t3.ans.net (192.157.69.13) 34.262 ms 28.245 ms*
11 h2-0.t32-0.New-York.t3.ans.net (140.223.33.129) 75.049 ms 36.288 ms 76.362 ms
12 h5-0.t36-1.New-York2.t3.ans.net (140.223.33.10) 131.381 ms 50.834 ms 47,809 ms
13 f0-0.c36-11.New-York2.t3.ans.net (140.223.36.222) 47.26 ms 59.422 ms 33.59 ms
14 Dante-UKERNA.t3.ans.net (204.151.184.26) 233.183 ms 200.409 ms*
15 smds-gw.ulccja.net (193.63.94.12) 211.977 ms 222.577 ms 216.284 ms
16 smds-gw.camja.net (193.63.203.36) 237.009 ms 337.539 ms*
17 route-cent-1.cam.ac.uk (131.111.1.62) 212.342 ms * 208.946 ms
18 mauve.csi.cam.ac.uk (131.111.8.38) 234.515 ms 266.596 ms*

In looking at this outcome, it is fairly clear that packet loss problems develop from hop 14 onward. In fact, about a third of the packets are being dropped from hops 14 and onward suggesting very poor performance. This is indicative of some sort of congestion problem.

Figure 3:
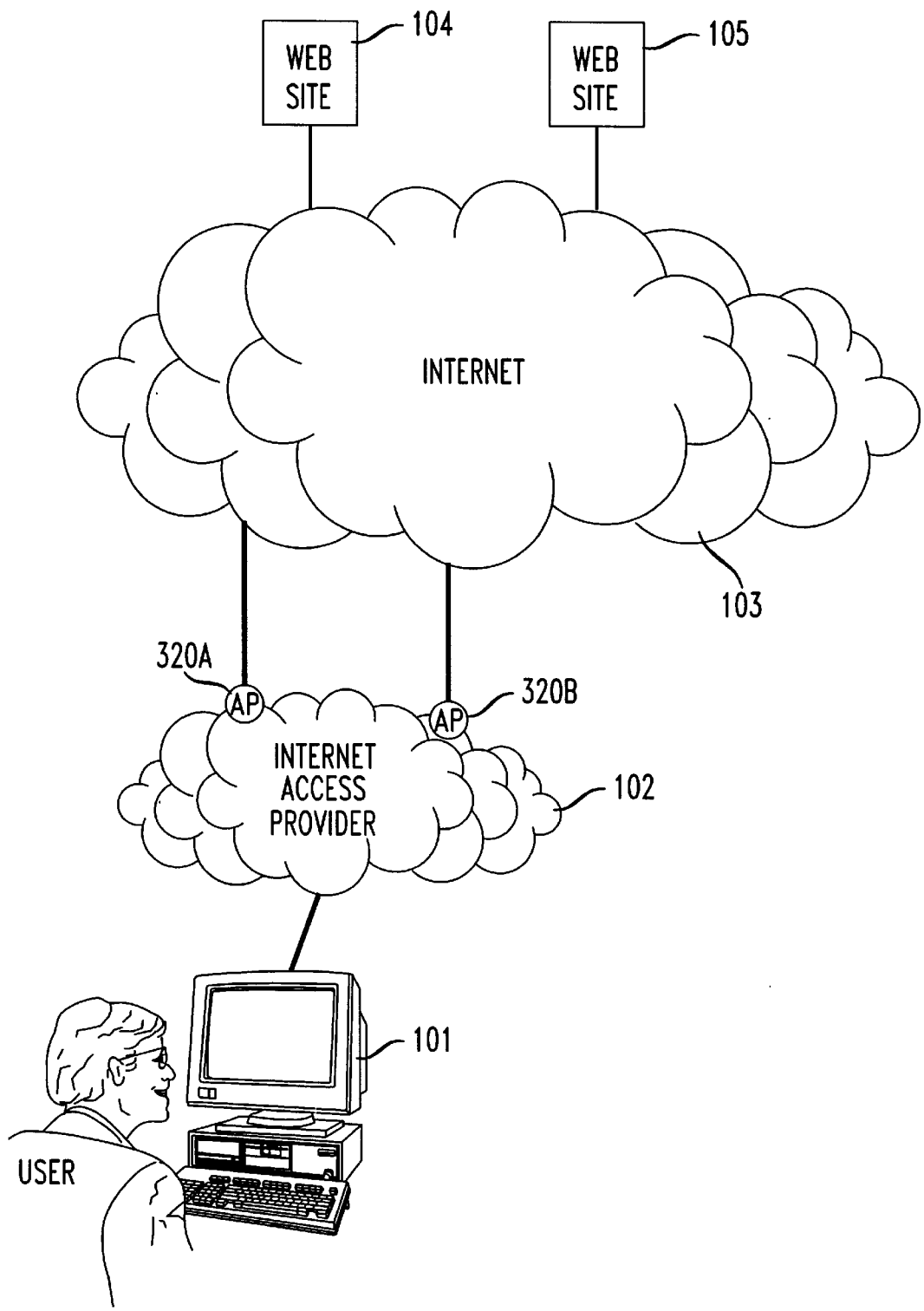
FIG. 3 is a schematic diagram of a network arrangement incorporating an embodiment of the present invention.

The raw data pertaining to each of the access provider's entry points into the Internet could be gathered in a number of ways. For instance, the Access provider can hang an "agent" off of each entry point. These agents are shown as 320A and 320B in FIG. 3. Each agent would include a programmed processor and storage capabilities. The program would perform the steps described below in connection with FIGS. 4 and 5. Each agent would then independently execute the data gathering operation and process it as described below to make it available to the users assigned to that entry point. Alternatively, the provider could provide a centralized data gatherer which gathers the transit characteristics for each entry point.

To assure that the snapshots of routing congestion are accurate over time the agent would periodically cycle through a list of desired destinations so that the command is executed with respect to each destination 5 or 6 times per hour.

The above describes how information is gathered with regard to connection across the Internet. The present invention then compiles this information and derives transit characteristics between the selected termination points. This transit characteristic information is stored in an access provider database or databases. The information can be stored in various forms. For instance, the raw data regarding round-trip transmission times and lost packet data could be stored in the database. Alternatively, calculations or estimations could be made based on the detected data and the database could store information about the status of links to a particular web site, e.g., heavily congested, mildly congested, clear, etc.

In one possible embodiment the calculations identify hops where congestion occurs by analyzing the average round trip times and the average number of data packets lost over the hops. The analysis would include examining the data to determine at which hops the average round trip time and/or average number of packets lost increased in a rapid or spike like manner. In the first example above in which a route to netscape.com is traced, the average round trip time is smoothly increasing from hop 1 to hop 9. But at hop 10 it makes a dramatic jump upward and stays high for subsequent hops. This is an indicator that the hop is congested. The same can be said with respect to an increase in the frequency of losing data packets. Thus, this analysis provides the access provider with an indicator of whether a route to a web site is congested and what link along the route is likely to be responsible. Naturally, the database could store combinations of these types of information and provide the end user with the appropriate calculated information based on the raw data collected from the execution of the traceroute command.

Once the information is obtained, the provider must have a way of presenting the information to the end user.

In accordance with the present invention, in one embodiment when the subscriber informs the access provider that connection to the Internet is desired, the provider automatically provides a "page" for viewing that gives the subscriber a number of options for available services. One such option could be a traffic reporting option suggested by some graphic item, for example a helicopter icon. Once the subscriber selects the traffic reporting icon, the access provider database could provide various menu items to the subscriber, for instance, a user file which includes destination preferences. These destinations could be presented to the user as possible termination points for which traffic information is desirable. Once the user selects the desired end destination, the database accesses the traffic information associated with that destination site.

Another option under the traffic reporting service would be to analyze the transit characteristics to each of the desired web sites and calculate peak load and low load time frames with the intention of providing advice to the subscriber as to the best time to connect to a given web site. This could be done in conjunction with a day evening monitor program (daemon) which is known in the art. In accordance with such a program the congestion along routes is tracked during the course of a day to determine the times of heaviest and lightest traffic.

In yet a further modification to the service available to the end user, the access provider could optionally provide a map-like representation of the routing from the multiple access points to the desired web site with information about each of the routing options. In the present configuration of the Internet, the user has little choice as to how a call is routed to a given web site. However, the statistical information gathered about the routing from any one of the plurality of entrance points to the desired web site might be used by the Internet access provider itself to optimize the user's connection into the Internet. For example, if it was determined that the routing from access point 203 through nodes G, F and D to the web site as shown in FIG. 2, was less congested than via hops A to C and C to D originating from entry point 202, then the access provider could opt to connect the subscriber into the Internet through access point 203 rather than access point 202 regardless of the geographical position of the subscriber with respect to these two entry points.

Figure 4:
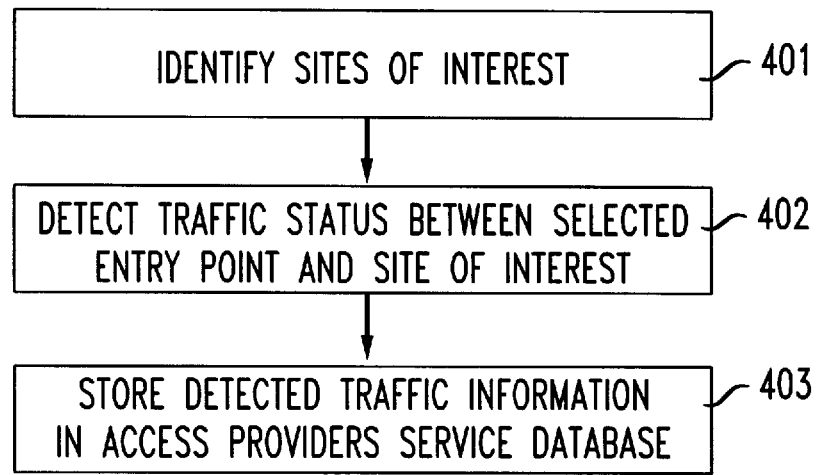
FIG. 4 and FIG. 5 are flowcharts for explaining a service process in accordance with the present invention.
Figure 5:
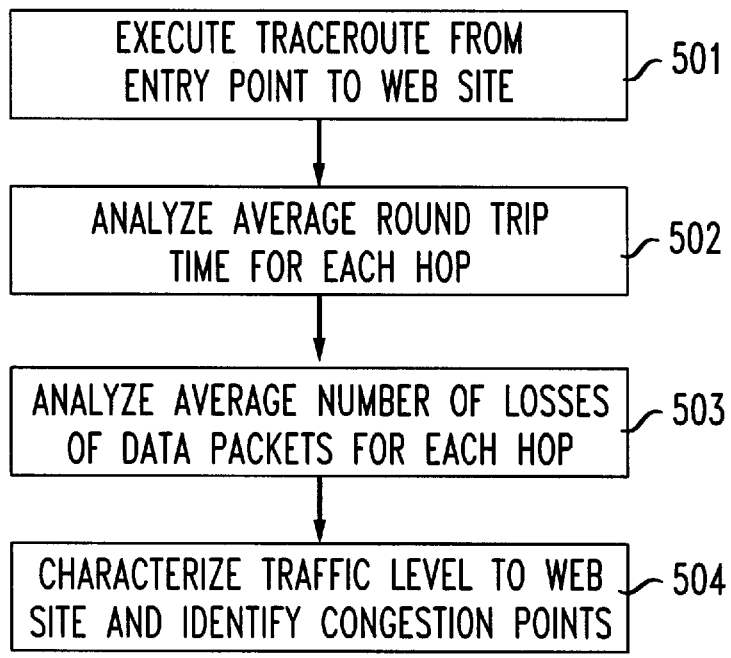

The present invention could be supported by software developed to compile the transit characteristic information from multiple executions of the traceroute command to selected destination sites in accordance with the flow charts of FIGS. 4 and 5.

In particular, the software should identify destination sites of interest, step 401. Then it must detect traffic status between a selected entry point into the Internet and a site of interest, step 402. Then it must store detected traffic information in an access provider database, step 403.

The detection operation is performed in accordance with the steps set forth in FIG. 5. In particular, the detection agent executes "traceroute" from the selected entry point to the selected web site, step 501. Software then analyzes the average roundtrip time given for each hop in the results obtained from executing "traceroute", step 502. Next, the software analyzes the average number of lost packets for each hop as given by the results obtained from executing "traceroute", step 503. Next, the software characterizes the traffic level to the web site and identifies congestion points based on the previously detected data, step 504.

Furthermore, the software would develop the appropriate presentation style for the information, for example, the presentation of the service button and the menu routine to be provided to the subscriber to facilitate usage of the service. All of these modifications are well within the skill of those in the art.

The present invention uses well known tools to gather pertinent information about congestion to web sites of interest and then presents this information in a logical and efficient fashion so as to apprise subscribers of the congestion they are likely to face to a given web site, what link or links are the likely source of the congestion and to advise subscribers of the best times to attempt to access a particular web site. In addition, the present invention provides useful routing information for the Internet access provider itself so that it can optimally select an entry point into the Internet for a given subscriber and the web site of interest. This compiled and analyzed transit characteristic information might also be the foundation for other services to advise the user and the access provider itself of critical information about the health of the network in terms of its ability to provide throughput to particular web sites.

What is claimed is:

1. A method for advising users of a communications network of a level of activity on the communications network, the method comprising the steps of:
   a) selecting a destination site;
   b) selecting an entry point into the network;
   c) tracing a transmission route, including a plurality of links and at least one intermediate point between said entry point and said destination site, from said entry point to said destination site;
   d) gathering transit characteristics information regarding said transmission route by detecting occurrences of packet loss and measuring round trip transmission delay, on at least one of the links;
   e) determining a network activity status based on said transit characteristics;
   f) storing the network activity status;
   g) receiving a request for a level of activity on said network related to said destination site; and
   h) reporting activity status based on said stored network activity status, in response to said request.

2. The method of claim 1 wherein the network includes a plurality of destination sites of interest and comprises the step of repeating steps a), b), and c) for each destination site of interest.

3. The method of claim 2 comprising the step of prompting a user to submit a request for a level of activity of said network.

4. The method of claim 3 wherein said step of prompting includes providing a menu of destination sites of interest.

5. The method of claim 4 comprising the step of customizing the menu of destination sites of interest based on user preferences.

6. The method of claim 1 comprising the further steps of:
   analyzing said transit characteristics information to determine historical activity level;
   storing said historical activity levels for access by network users.

7. A method of reporting congestion level information associated with accessing a destination address of a wide area communications network comprised of a plurality of interconnected data communications networks, the method comprising the steps of:
   monitoring traffic level on a plurality of links connecting an access provider network to the destination address of the wide area communications network by detecting occurrences of packet loss and measuring round trip transmission delay, on at least one of the links;
   storing on a storage device of said access provider network information indicative of the traffic level for at least one of the links; and
   in response to a request from a user of the access provider network who wishes to access the destination address, transmitting said traffic level information to said user.

8. The method of claim 7 wherein said transmitting step further includes the step of:
   sending to said user data identifying at least one of said data communications networks as a source of traffic congestion to said destination address.

9. The method of claim 7 wherein said transmitting step further includes the step of:
   sending to at least one of said data communications networks a message indicating that at least one of said data communications networks is a source of traffic congestion to said destination address.

10. A traffic reporting system for a data communication network comprising:
    a computer which executes a daemon process to monitor traffic level on a plurality of links connecting an access provider network to a destination address of a data communications network by detecting occurrences of packet loss and measuring round trip transmission delay, on at least one of the links;
    a storage device of the access provider network on which information associated with the traffic level on at least one of the links is stored; and
    means for transmitting to a user the information associated with the traffic level on at least one of the links in response to a request from the user for accessing the destination address.

* * * * *